Patented June 6, 1950

2,510,919

UNITED STATES PATENT OFFICE 2,510,919

PROCESS FOR RENDERING CELLULOSIC TEXTILE MATERIALS TRANSPARENT AND PRODUCTS THEREFROM

Ernst Weiss, Bunt, Wattwil, Switzerland, assignor to Heberlein Patent Corporation, New York, N. Y., a corporation of New York No Drawing. Original application March 27, 1948, Serial No. 17,596. Divided and this application December 16, 1948, Serial No. 65,745. In Switzerland October 26, 1942

5 Claims. (Cl. 117—37)

This invention relates to a process for rendering textile materials transparent and particularly to producing such transparent fabrics by the use of special groups of synthetic resins employed with selected fabrics under restricted conditions, as hereinafter set forth. The invention also relates to the products resulting from such process.

One object of the invention is to provide improved fabrics of this type which show an all-over effect or a pattern design. Other objects and advantages will appear from the following description.

The invention accordingly comprises the novel products as well as the novel processes and steps of processes according to which such products are manufactured, the specific embodiments of which are described hereinafter by way of example and in accordance with which I now prefer to practice the invention.

This application is a continuation-in-part of my copending applications Serial No. 504,119½, filed September 28, 1943, and Serial No. 578,567, filed February 17, 1945, both now abandoned, and is a division of my copending application Serial No. 17,596, filed March 27, 1948, now Patent No. 2,466,066. In said last mentioned application, the process for rendering cellulosic textile materials transparent and products therefrom, is claimed broadly, and is claimed specifically with regard to melamine formaldehyde ether resin, and with respect to certain aminoplast ether resins reacted with alkyd resins. In the present application, the invention is claimed broadly and specifically with regard to urea formaldehyde ether resins.

I have found in accordance with my invention that such transparent fabrics may be obtained by the use of cotton and artificial silk with ether resins selected from the group consisting of an aminoplast ether resin and an aminoplast ether resin reacted with an alkyd resin having a free hydroxyl group in which the ether radical other than that of the alkyd group contains no more than 7 carbon atoms.

The fabric employed is an open-meshed fabric selected from the group consisting of regenerated cellulose, as rayon and spun rayon fabric, and cotton fabric. Also silk, wool or fibres from superpolyamides or polyurethanes known under the name of nylon and Perluran or Perlon are suitable as starting materials. The fabric which I employ to give the transparent effect is air- or fluid-permeable and has 45 to 130 threads per inch, the threads being No. 30 to No. 200 English count for cotton and spun rayon fabrics and 45 to 150 denier for rayon fabrics. The following fabrics have been satisfactorily employed in the carrying out of the invention: muslin, Geisha, voile, cretonne, crepe Georgette, and crepe de Chine, which employ cotton, spun rayon and artificial silk of regenerated cellulose. The number of threads per inch, as well as the kinds of threads, No. 30 to No. 200 English count for cotton and spun rayon fabrics and 45 to 150 denier for rayon fabrics, as above indicated, occur in the fabrics last-mentioned.

The resin is employed in the form of a fluid composition which may be either a solution or an emulsion which contains 10 to 80% of ether resin. The ether resins which I employ are insoluble in water, but are soluble in organic solvents. Specific resins which I have successfully employed include melamine formaldehyde ether resin, urea formaldehyde ether resin, alkyd amino triazine aldehyde mixed resin, and alkyd urea formaldehyde mixed resin. The ether radicals in each of the above may be introduced by condensation with alcohols containing from 1 to 7 carbon atoms, namely, by condensing with methyl, ethyl, propyl, butyl, amyl, hexyl or heptyl alcohols and also with polyvalent alcohols. I have obtained particularly good results by the use of butyl alcohol.

After impregnating the fabric with resin, it is heated at an elevated temperature; whereupon, the resin sets and the fabric acquires a transparent condition and has a soft handle. The fabric in its completed transparent condition contains about 15 to 45% by weight of said resin based on the weight of the original fabric.

The fabrics made in accordance with my invention are distinguished from the so-called oil skins heretofore proposed and manufactured which are made up of silk and other fabrics in closely woven condition with a continuous air-impermeable coating of various kinds of resins in which the completed oil skin contains from 50% to 500% of resin coating based on the weight of the fabric.

Open-meshed fabrics treated in accordance with my invention by applying the resins herein described to produce an all-over effect, result in open-meshed and porous fabric, like organdy. Open-meshed fabrics locally printed with such resin compositions result also in fabric which is open-meshed in the printed portions.

The production of this transparent or organdy effect, I believe to be due to the fact that the regenerated cellulose and cotton fabrics employed have substantially the same refractive indices as the ether resins (in dried condition) with which they are impregnated in accordance with my invention.

Softeners may be employed in the resin solution or emulsion, such as, for instance, tricresyl phosphate, diethyl phthalate and similar products. They may also be added prior to the impregnation or during the production of the synthetic resin precondensate. In applying the resins as solutions, they are used ordinarily in organic solvents, for instance, but without limitation, in liquid alcohols. These resins, as stated, are substantially insoluble in water. Instead of using them in organic solvent solution, they may be employed as emulsions in water with suitable emulsifying agents.

When pattern effects are applied locally, the effectiveness of such patterns may be increased by combining same with pigment printing, pigment resists and, if desired, by subsequent local shrinking of the fabrics.

The impregnation is carried out, for instance, by the use of a foulard or padding machine, or by a coating knife. Interesting pattern-effects are obtained by previous printing with a pigment resist. In case of patterns effected by direct local application, a sufficiently viscous solution or emulsion is applied by roller printing or stencil printing, and preferably by adding to the solution or emulsion softeners and thickening agents.

After application, baking occurs preferably in the absence of catalysts having an acid reaction.

The treated fibres possess the properties of having a higher transparency than the basic fiber material; having a content of amino plast ether resins and a reduced tendency to curl and shrink upon washing.

The following are examples of the manufacture and application to textiles of various ether resins. Resins A, B are representative of unmixed resins, i. e., without the alkyd group, and Examples 1 to 17, inclusive, represent the application thereof to fabrics. The remaining examples are to the production and application of the mixed resins, i. e., containing the alkyd group. It is to be understood that these examples are illustrative of the invention and the invention is not to be considered as limited thereby except as indicated in the appended claims.

EXAMPLES

PREPARATION OF THE ETHER RESINS (A) *Resin.—Urea formaldehyde butyl ether resin*

|  | Grams |
|---|---|
| N-butanol | 454 |
| Paraformaldehyde | 300 |
| Hexamethylene tetramine | 6 |
| Urea | 240 |
| Formic acid | 0.6 |

Paraformaldehyde and hexamethylene tetramine are dissolved in hot N-butanol. After cooling, the urea is added and thereupon the solution is brought slowly to the boiling point, then boiled for about 20 minutes under a reflux condenser. Thereupon the formic acid is added. The reaction water formed upon further heating and part of the butanol are distilled off. The mixture of butanol and water found in the distillate is separated; the butanol is returned to the reaction mixture while the quantity of reaction water obtained is continuously checked. The distillation is continued until about 2 mols of reaction water have separated—which when using the above quantitative ratios, is 144 grams of water. The result is a viscous stable solution of urea formaldehyde butyl ether resin in butanol, containing about 80% of resin.

(B) *Resin.—Melamine formaldehyde butyl ether resin*

One thousand grams of hexamethylol melamine are added to 3,000 grams of N-butanol while using a reflux condenser. Thereupon, 100 cc. of concentrated formic acid containing 120 grams of formic acid are added and the reaction water obtained and a part of the excess butanol are slowly distilled off. The distillation is advisedly continued until 2,000 grams of distillate have passed over. The solution obtained then contains about 80% of melamine formaldehyde butyl ether resin.

(C) Fifty grams of boiling water are poured over 2.5 grams of methyl cellulose and stirred, under refrigeration, until completely dissolved, then 100 grams of water saturated with butanol is stirred in; then 3 grams of dimethyl benzyl lauryl ammonium chloride dissolved in 9 grams of ethyl alcohol (30%) are stirred in; thereupon 100 grams of A Resin solution, prepared according to the example above, and diluted with butanol to a resin content of 60% is added while vigorously stirring. The result is a 23% emulsion of urea formaldehyde butyl ether resin in water.

(D) One gram of polyvinyl alcohol is dissolved in 60 grams of water; then 30 grams of 5% aqueous solution of methyl cellulose and 9 grams of butanol are added; thereafter 100 grams of melamine formaldehyde butyl ether resin (70%) B Resin solution, prepared according to the example above, is added while vigorously stirring. The result is a 35% emulsion in water of melamine formaldehyde butyl ether resin.

Resin solutions and emulsions of Resins A and B are solutions or emulsions of unset resins which are set by heating to the temperatures for baking given in the examples.

The viscosities of the resin solutions as employed in accordance with the invention may vary through wide limits, since all solutions which may be applied satisfactorily and which will impregnate the fabric are usable. Heating of the solution will lower the viscosity and, accordingly, some solutions which may be applied with difficulty can be used since upon heating as indicated in the examples below, sufficient penetration to impregnate the fabric will occur. The viscosity of the resin solutions as applied may accordingly range from 100 to 10,000 centipoises.

EXAMPLES

APPLICATION OF SOLUTIONS AND EMULSIONS TO FABRIC

1. A muslin fabric consisting of viscose rayon both in the warp and in the filler, with a titer of 60–75 deniers and having 84 x 72 threads per inch, is subjected to a preliminary cleaning in accordance with known methods and dried under tension. Thereupon the fabric is thinly coated on a spreading machine directly with the resin solution in butanol obtained in accordance with A Resin; thereupon dried at about 60° C. and subsequently heated for 15 minutes at 110° C. There is thus obtained an exceptionally transparent fabric which is only slightly stiffened. The fabric contains about 40% resin based on the weight of the original fabric.

2. A colored muslin fabric of viscose rayon having 84 x 72 threads per inch is impregnated on a two-roller padder with the following mixture and then squeezed:

| | Grams |
|---|---|
| Resin solution made in accordance with Resin A | 800 |
| Tricresyl phosphate | 100 |
| Ethyl alcohol | 100 |

The squeezed fabric is then subjected to a preliminary drying at 60° C. and thereupon heated for one hour at 90° C. The fabric now shows a typical transparent effect; however, contrary to the organdy fabrics customary up to the present time in the trade, it is comparatively soft. By the treatment, furthermore, a strong intensification of the colors is achieved. The fabric contains about 35% resin based on the weight of the original fabric.

3. Viscose rayon crepe Georgette having 91 x 84 threads per inch is desized in accordance with the known methods, bleached and thereupon dried under sharp tensioning in the direction of the warp and of the filler. Thereupon the resin solution produced in accordance with A Resin is printed on. If the printing should not turn out sharply, i. e., if it should show a tendency to run, it is advisable to thicken the printing mass, for instance by the addition of nitrocellulose. In accordance with the following instructions, one obtains, on most fabrics, sharp clear prints:

| | Grams |
|---|---|
| Resin solution made in accordance with Resin A | 700 |
| Nitrocellulose of medium viscosity wetted with butanol | 100 |
| Amylacetate | 200 |

After printing, the fabric is subjected to a preliminary drying at 40–50° C. and then heated for 10 minutes at 120° C. The unprinted portions or background are again creped by treatment in a 40–50° C. bath containing 2–3 grams of soap or 1 gram of Igepon T/L. The goods are thereupon rinsed and dried under slight tension. In this manner one obtains transparent, smooth to slightly undulated, printed effects on a crepe background.

4. A fabric made from cuprammonium rayon, the warp of which consists of crepe yarns and the filling of ordinary yarns having 105 x 65 threads per inch, is creped, boiled and dyed in accordance with the customary methods. Thereupon the following mass is printed on:

| | Grams |
|---|---|
| Resin solution made in accordance with Resin A | 700 |
| Diethylphthalate | 20 |
| Nitrocellulose of medium viscosity containing 35% ethyl alcohol | 80 |
| Ethyl acetate | 200 |

The printed fabric is predried at 50–60° C. and then heated for 30 minutes at 100° C. In this manner one obtains transparent printed effects; the contrast between the printed and unprinted portions being much increased by a considerable deepening of the color in the printed parts.

5. Bleached viscose staple fiber muslin having 87 x 80 threads per inch is printed with the mass mentioned in Example 4. It is then subjected to a predrying at 50–60° C. and then heated for 5 minutes at 140° C. Thereupon the fabric is dyed with substantive dyes. The dyeing on a padder in this connection proves to be exceptionally favorable. On account of the resist effect of the resin mass, the printed parts are not dyed at all or only slightly. In this manner, one obtains white or slightly colored transparent printed effects on a colored, opaque background.

6. The resin solution obtained in accordance with Resin A is printed on mercerized cotton muslin having 84 x 68 threads per inch, dried and then heated for 5 minutes at 140° C. Thereafter the printed fabric is placed in caustic soda solution of 30° Bé. for 4 minutes; whereupon, and preferably after drawing or suctioning off the excess lye, the remaining lye is removed with hot water, and the fabric is then acidified and washed until neutral. Finally the fabric is dried under slight tension. Depending on the selection of the pattern, one obtained more or less strongly undulated comparatively soft transparent patterns on a shrunken background.

7. Mercerized cotton muslin having 87 x 80 threads per inch is printed with the resin solution obtained in accordance with Resin A. If the printing mass should have a tendency to run, then it can be further thickened by an addition of a small quantity of nitrocellulose plus amylacetate. After the printing, the goods are subjected for a short time to predrying and thereupon heated for 5 minutes at 140° C. The fabric is thereupon again printed but with the use of 1:1 gum arabic solution. Interesting effects are obtained if one uses for the printing with the resin mass a fancy design with irregularly distributed areas and lines while for the printing over with gum arabic one uses a simple stripe design. After the printing over, the goods are dried, treated with 30° Bé. caustic soda as described in Example 6, and after the excess lye is removed, the goods are acidified, washed until neutral and thereupon dried with as little tension as possible. The resulting fabric shows transparent and, in accordance with the design, smooth to slightly undulated printed parts on an undulated crepe-like background.

8. Viscose marquisette having 60 x 66 threads per inch is impregnated with a solution of the following composition and thereupon strongly squeezed:

| | | |
|---|---|---|
| Resin mass produced in accordance with Resin B (containing about 80% of the melamine formaldehyde butyl ether resin) | cc | 800 |
| Tartaric acid | gr | 3 |
| Ethyl alcohol | cc | 200 |

Thereupon the goods are subjected to predrying at increased temperature and then heated for 5 minutes at 140° C. The fabric in this way is made transparent to a far-reaching degree without being stiffened to a disadvantageous extent. The fabric contains about 30% resin based on the weight of the original fabric.

9. Bleached viscose muslin having 87 x 80 threads per inch, color printed in accordance with the customary fabric printing methods, is thinly coated with an approximately 70% of resin mass produced in accordance with Resin B and thereupon heated for ½ hour at 100° C. One obtains in this way a beautiful clear transparent fabric with colored printing effects. The resin content based on the weight of the untreated fabric is about 40%.

10. Crepe Georgette consisting of viscose crepe yarn both in the warp and in the filler having 91 x 84 threads per inch, is scoured and bleached in accordance with the known methods. Thereupon it is subjected to a preliminary tentering with strong tensioning in the direction of the warp as well as in the direction of the filler and printed with:

| | Grams |
|---|---|
| Resin mass produced in accordance with Resin B (containing about 80% of the melamine formaldehyde butyl ether resin) | 700 |
| Nitrocellulose of medium viscosity, wetted with butanol | 100 |
| Amylacetate | 200 |

After drying, heat for 5 minutes at 140° C. The fabric is then placed in a dye bath preheated to about 50° C. and dyed preferably with the use of substantive colors in order to obtain the desired shade. Thereby the background is creped while the printed places remain smooth or are slightly undulated. The printed places are not colored or only very slightly. Finally the fabric is dried with the least possible tensioning. The results are white or slightly colored, smooth or slightly undulated transparent printed parts on a colored crepe background.

11. Mercerized bleached cotton voile having 60 x 53 threads per inch is printed with the mass described in Example 10, dried and heated for 10 minutes at 130° C. Thereupon the fabric is printed over with thickened caustic soda solution of 40° Bé. preferably in the form of a stripe design, then set aside for some time, namely, until the desired contraction of the printed places has occurred and thereupon the lye is removed with hot water, and the goods are acidified and washed. Finally the goods are dried with the least possible tension. One obtains in this way transparent printing effects on a crepe-like undulated background.

12. Bleached viscose muslin having 87 x 80 threads per inch is printed with a pigment resist of the following composition:

| | Grams |
|---|---|
| Acetyl cellulose | 40 |
| Phenol | 150 |
| Acetone | 500 |
| Titanium white | 260 |
| Distilled water | 50 |
| | 1000 |

After the drying out of the printed parts, the fabric is thinly coated as described in Example 1 with the resin solution obtained in accordance with Resin A, then subjected to a preliminary drying and thereupon heated for 15 minutes at 110° C. The fabric now shows striking white opaque print effects on a transparent background. It has stiffened comparatively little. The fabric contains about 40% resin based on the weight of the original fabric.

13. Mercerized bleached cotton muslin having 84 x 68 threads per inch is printed in one printing process with the use of two design rollers which are in registration with each other; one roller prints with the pigment resist of Example 12 and the other roller prints directly on top of the first print with Resin B, thickened with nitrocellulose (as per Example 10). Now the fabric is heated for 15 minutes at 140° C. and thereupon shrunk by placing in 30° Bé. caustic soda. After the removal of the lye, acidification and washing, the goods are dried with the least possible tension. In this way one obtains very striking white printed effects on transparent and only slightly stiffened lightly undulated design parts which are surrounded by a dense muslin background.

14. Mercerized bleached cotton muslin having 84 x 68 threads per inch is printed in one printing process as described in Example 13 consecutively with pigment resist and thickened Resin B and then again heated. Thereupon in a further printing process, it is printed over with gum arabic resist; whereupon the goods are dried and impregnated on a padder with 36° Bé. caustic soda solution, then squeezed, set aside for 3-5 minutes without being tensioned and subsequently the lye is removed with hot water. Finally after acidification and washing, the fabric is dried with the least possible tensioning. The fabric has now been given slightly stiffened transparent design parts with white opaque printing effects in same and alongside of same unchanged and shrunken fabric parts.

15. A muslin made up of cotton warp and viscose filling having 91 x 76 threads to the inch is impregnated on a padder with emulsion designated as (C) above. The material is then dried at about 50 to 60° C. and subsequently heated for ten minutes at 120° C. There is thus obtained a transparent fabric. The fabric contains about 20% resin based on the weight of the original fabric.

16. A cotton and viscose muslin as in Example 15 is impregnated on a two roller padder with resin emulsion designated as (D). The material after predrying at 50-60° C. is then baked during four minutes at 140° C. The fabric produced is transparent and only slightly stiffened. The fabric contains about 30% resin based on the weight of the original fabric.

17. Viscose rayon marquisette, having 60 x 66 threads per inch, is impregnated on a two roller padder with a diluted resin emulsion; to one part of resin emulsion designated as (D), two parts of water are stirred in. The fabric is then dried at about 50 to 60° C. and subsequently heated for 6 minutes at 130° C. There is then produced a translucent fabric well suited as curtain material. The resin content of the so treated material is about 15%.

18. A dyed muslin fabric which is an open-meshed fabric, the warp and filling consisting of viscose rayon, having 84 x 72 threads per inch, is impregnated on a coating machine with a solution of an alkyd aminoplast ether resin, namely, an alkyd-amino-triazine-aldehyde mixed resin in butanol, containing 60% dry residue, and subjected to a preliminary drying at about 60-70° C. Thereupon the fabric is heated for 15 minutes at 120° C. In this way there is obtained an all-over effect, viz., a pronounced transparent fabric which has an open mesh and which is only slightly stiffened comparatively. The fabric contains about 40% resin based on the weight of the original fabric.

A suitable mixed resin is obtained in the following manner: 92 parts of glycerin are esterified with 71 parts of stearic acid by heating to 220-240° C. up to an acid number of 6. Thereupon esterification is continued with 148 parts of phthalic anhydride up to an acid number of 42. In order to etherify the remaining hydroxyl groups of the glycerin, the alkyd resin thus obtained is boiled under reflux with 102 parts of hexamethylol melamine, dissolved in 222 parts of butanol, for 1½ hours. Thereupon the solvent is distilled off until a 70% resin solution in butanol is obtained.

19. Bleached viscose staple fibre muslin, an open-meshed fabric, having 87 x 80 threads per inch, is printed with a mass of the following composition:

| | Grams |
|---|---|
| 80% solution of an oleic acid modified alkyd-amino-triazine-aldehyde mixed resin in butanol | 800 |
| Nitrocellulose of medium viscosity, moistened with 35% butanol | 20 |
| Amylacetate | 180 |
| | 1000 |

After the printing, preliminary drying is effected at 60-70° C. and thereupon the mass is heated for 5 minutes at 130° C. Now the goods are dyed with the use of substantive dyestuffs. The dyeing on a padding machine is particularly favorable. As a result of the resist action of the resin, the printed parts are dyed little or not at all. In this way, light, transparent open-mesh printed effects on a dyed non-transparent background are obtained. In cases in which a particularly good resist of the printed effects is important, in addition to the selection of the proper dyestuffs, the addition of thiophenols (which have beeen made soluble) to the dye bath is advantageous. In the trade, such soluble thiophenols are known under the names of Katanol W, Thiotane RS, etc.

The above oleic acid modified resin can, for instance, be prepared as follows: 92 parts of glycerin are esterified with 141 parts of oleic acid and 148 parts of phthalic anhydride by heating for several hours at 220–240° C. up to an acid number of 30. The resin thus obtained is dissolved in 222 parts of butanol, and 102 parts of hexamethylol melamine are dissolved therein by heating. The solution is then heated for 4 hours at 100° C., whereupon enough butanol is distilled off so that an 80% resin solution in butanol is obtained.

20. Crepe Georgette viscose rayon, an open-meshed fabric having 91 x 84 threads per inch, is desized in accordance with the known methods, bleached, and then dried under sharp tensioning in the direction of the warp and filling. Then the fabric is printed with the resin as described in Example 19, subjected to preliminary drying, and thereupon heated for 4 minutes at 140° C. By treating in a 30–40° C. bath, containing 2-3 grams of soap or ½ to 1 gram of an aliphatic alcohol sulfonate or ½ to 1 gram of a fatty acid condensation product such as Igepon per liter, the unprinted background is again creped. In many cases, insertion of the goods in 30–40° C. water suffices to effect this subsequent creping. After this creping treatment, the goods are rinsed, if necessary, whereupon they are dried under slight tensioning. In this way there are obtained transparent, smooth to slightly wavy, printed effects on a typical crepe background.

21. An open-meshed fabric produced from cuprammonium rayon, the warp of which consists of crepe yarn and the filling of which consists of ordinary yarn, having 105 x 65 threads per inch, is creped in accordance with the customary methods, soaped and dyed, for instance, light blue, with a substantive dyestuff. The goods are thereupon dried while stretching same well in the direction of the warp and of the filling. The goods are thereupon printed with the printing mass described in Example 19, subjected to a preliminary drying at 60 to 70° C., heated for 30 minutes at 110° C., subjected to recreping by placing in water of 30° C., and dried while under slight tension. Depending on the intended purpose, the fabric can be finished and calendered in accordance with the customary methods. One obtains in this way transparent printing effects on an opaque background. The contrast between the printed parts and the background is further essentially increased by a considerable intensifying of the colors in the printed parts.

The transparent prints can also be combined with ordinary color prints, in connection with which it is possible to print, for instance, vat dyes, in one printing process simultaneously with transparent printing masses.

22. A spun rayon cretonne, having 70 x 70 threads per inch, is printed with a mass which essentially consists of mixed alkyd-urea-aldehyde resin which is an alkyd aminoplast ether resin. Such a mixed resin can be produced as follows: 92 parts of glycerin are esterified with 71 parts of stearic acid by heating at 220–240° C. up to an acid number of 6. Thereupon the esterification is continued with 148 parts of phthalic anhydride up to an acid number of 42. The alkyd resin thus obtained is now dissolved in 222 parts of butanol and 120 parts of dimethylol urea are added. The mixture is boiled for 2 hours under reflux and thereupon such a quantity of solvent is distilled off that an 80% resin solution in butanol results. The printing mass produced from this resin solution has the following composition:

| | Grams |
|---|---|
| Alkyd-urea-formaldehyde mixed resin 80% | 750 |
| Tricresyl phosphate | 60 |
| Nitrocellulose of medium viscosity moistened with 35% ethyl alcohol | 20 |
| Amyl acetate | 50 |
| Ethyl acetate | 50 |
| Toluol | 70 |
| | 1000 |

After the printing, pre-dry at 70 to 80° C. and thereupon heat for 3 minutes at 150° C. Thereupon the goods are advisedly finished with one of the softening agents generally known in finishing practice; then dried under tension and calendered. The fabric now shows comparatively soft transparent printing effects on an opaque and lustrous background. Depending on the incidence of the light, the prints obtained in this manner remind one of marked damask effects.

23. A mixed resin produced in accordance with Example 18, is adjusted, by the addition of amyl acetate, to a resin content of 65% and thereupon printed on mercerized cotton muslin, an open-meshed fabric, having 84/68 threads per inch. Should the print be inclined to run, then the resin solution can be thickened by the addition of small quantities of nitrocellulose. After printing, subject the goods to a short preliminary drying and then heat for 5 minutes at 140° C. Now the printed fabric is placed for 4 minutes in a caustic soda solution of 30° Bé., whereupon, advisedly after previous drawing off by suction of the excess caustic soda lye, the lye is removed from the goods with warm water and thereupon the fabrics are washed in running water until the complete removal of the alkali. Finally the goods are dried under slight tension. Depending on the selection of the pattern, one obtains more or less strongly undulated and comparatively soft transparent patterns on a shrunken background.

With respect to the fabrics produced by printing in the above examples, such printed fabrics in the printed portions contain about 20 to 45% by weight of resin based on the weight of the original fabric.

Each of the fabrics employed in accordance with the above examples is within the range of 45 to 130 threads per inch of threads of No. 30 to No. 200 English count for cotton and spun rayon fabrics and from 45 to 150 denier for rayon fabrics.

The resin solutions in Examples 18 to 23 are solutions of unset resins which are set on baking.

The making of such compounds, as, for instance, alkyd - amino - triazine - aldehyde mixed resin is described in French Patent No. 867,065; analogous compounds with urea are described in British Patent No. 344,401.

An advantage of the process in accordance with my invention consists, for example, in that the synthetic resins used dry better and more rapidly than previously known materials. There is furthermore obtained an excellent transparent effect and an improved fastness to washing.

Special effects can be obtained, as explained in Example 19, if one dyes the fabric subsequently with substantive dyes, possibly with the addition of thiophenols which have been made soluble. Crepe fabrics, for printing with transparent patterns, are strongly stretched along the warp and along the filling, if necessary and are also dried in this condition and thereupon again creped, for instance, in a soap bath.

Unique or special effects can be obtained also if one dyes the fabrics before the placing on of the transparent patterns as stated, for instance, in Example 21. One obtains in this way, at the transparent places, a strong intensification of the dyeing. Similar effects can be obtained if one prints the fabrics with color patterns and if one applies simultaneously, alongside of same or over same, transparent patterns.

A further enrichment of the effects obtained by this process can be achieved by combination with pigment printing. Exceptionally interesting effects are obtained if one prints, in one printing operation, using differently adjusted printing rollers, first a pigment resist and on top of it a lacquer printing mass of, for instance, the kind described in Examples 19 or 22. One can produce in this manner attractive white or colored opaque pigment printing effects, in transparent, very little stiffened, pattern portions which, in turn, are surrounded by the unchanged or, if desired, shrunken fabrics. Such pigment prints can also be made preceding a single or plain all-over transparentizing in accordance with Example 18; one obtains then attractive opaque printing effects on a transparent open-mesh background. As binding agent for the pigment printing masses there can be used the customary binding agents, for instance, solutions of cellulose esters, but also solutions of the alkyd-aminoplast ether resin mixtures described in the foregoing examples.

By dyeing the resin masses, for which purpose among others the so-called alcohol soluble dyestuffs are very suitable, for instance, Sudan red, there are available a number of further variants especially for the production of printed effects. Interesting effects can also be obtained in the manner that after the printing of the resin masses on the cellulose fabric the dyeing is done with acid dyestuffs in connection with which only the printed places are deeply colored while the unprinted fabric parts are not colored at all or only slightly. If the dyeing is done in a bath which contains at the same time acid and substantive colors, one obtains the most varied two-color effects, depending on the dyestuff used.

While the invention has been described in detail according to certain preferred methods of carrying out the process, it will be obvious to those skilled in the art after understanding the invention, that changes and modifications may be made therein without departing from the spirit or scope of the invention, and it is intended in the appended claims to cover all such changes and modifications.

What I claim is:

1. A process for transparentizing textiles which comprises, impregnating an open-meshed fabric with an unmixed water-insoluble urea formaldehyde ether resin, said fabric being woven from thread selected from the group consisting of continuous filamentary rayon, spun rayon, and cotton, each of said rayons being of regenerated cellulose, said fabric having 45 to 130 threads per inch in warp and weft, said threads being No. 30 to No. 200 English number for cotton and spun rayon fabrics and 45 to 150 denier for continuous filamentary rayon fabrics, said ether resin being employed as a fluid composition containing 10 to 80% of said ether resin, the ether radical of said urea formaldehyde ether resin containing no more than 7 carbon atoms, and heating to render the impregnated material transparent, said material in completed transparentized condition having about 15 to 45% by weight of said resin based on the weight of the original fabric.

2. A process in accordance with claim 1, in which the resin is an unmixed urea formaldehyde butyl ether resin.

3. A process for printing fabric to produce a transparent design in accordance with claim 1, in which the fabric is impregnated with an unmixed urea formaldehyde ether resin in the form of a design.

4. A transparentized textile fabric in which the fabric is woven from thread selected from the group consisting of continuous filamentary rayon, spun rayon, and cotton, each of said rayons being of regenerated cellulose, said fabric having 45 to 130 threads per inch in warp and weft, said threads being No. 30 to No. 200 English number for cotton and spun rayon fabrics and 45 to 150 denier for continuous filamentary rayon fabrics, said fabric being transparentized by an unmixed urea formaldehyde ether resin in which the ether radical contains no more than 7 carbon atoms, said fabric after transparentizing treatment, having fluid permeable interstices.

5. A textile fabric in accordance with claim 4, having a patterned transparent effect.

ERNST WEISS.

REFERENCES CITED

The following references are of record in the file of this patent:

UNITED STATES PATENTS

| Number | Name | Date |
|---|---|---|
| 2,466,066 | Weiss | Apr. 5, 1949 |